United States Patent [19]

Liedtke et al.

[11] Patent Number: 4,541,334

[45] Date of Patent: Sep. 17, 1985

[54] MICR PRINTER

[75] Inventors: Ronald R. Liedtke, Addison; Joseph M. Clark, Elmhurst; Russell L. Sage, Park Ridge, all of Ill.

[73] Assignee: MICR Short Systems, Ltd., Madison Hts., Mich.

[21] Appl. No.: 664,149

[22] Filed: Oct. 24, 1984

[51] Int. Cl.⁴ .................................................. B41J 1/22
[52] U.S. Cl. ................................................... 101/93.18
[58] Field of Search ............... 101/93.18, 93.21, 93.22; 400/154.3, 154.5, 162.2, 163; 318/601, 685

[56] References Cited

U.S. PATENT DOCUMENTS

| | | | |
|---|---|---|---|
| 3,296,960 | 1/1967 | Felchecu et al. | 101/93.22 |
| 3,573,589 | 4/1971 | Berry | 400/154.5 X |
| 3,586,953 | 6/1971 | Markkanen | 400/154.5 X |
| 4,025,837 | 5/1977 | Meier et al. | 400/154.5 X |
| 4,039,067 | 8/1977 | Kashio | 400/154.5 |
| 4,131,840 | 12/1978 | Wiesner | 400/154.5 X |
| 4,142,140 | 2/1979 | Wiesner | 400/154.5 X |
| 4,258,622 | 5/1981 | Estrabaud et al. | 400/154.5 X |

OTHER PUBLICATIONS

"Velocity & Displacement Servo", IBM Tech. Disclosure Bulletin, vol. 19, No. 12, May 1977, pp. 4534-4535.

Primary Examiner—E. H. Eickholt
Attorney, Agent, or Firm—Harness, Dickey & Pierce

[57] ABSTRACT

A high speed desk top MICR printer for financial transaction documents and the like. The print wheel is stepped at a selectively variable rate determined by the number of required angular steps between consecutive printed characters. The step rate is selected to maximize print wheel acceleration and deceleration without loss of stepper motor synchronization.

10 Claims, 13 Drawing Figures

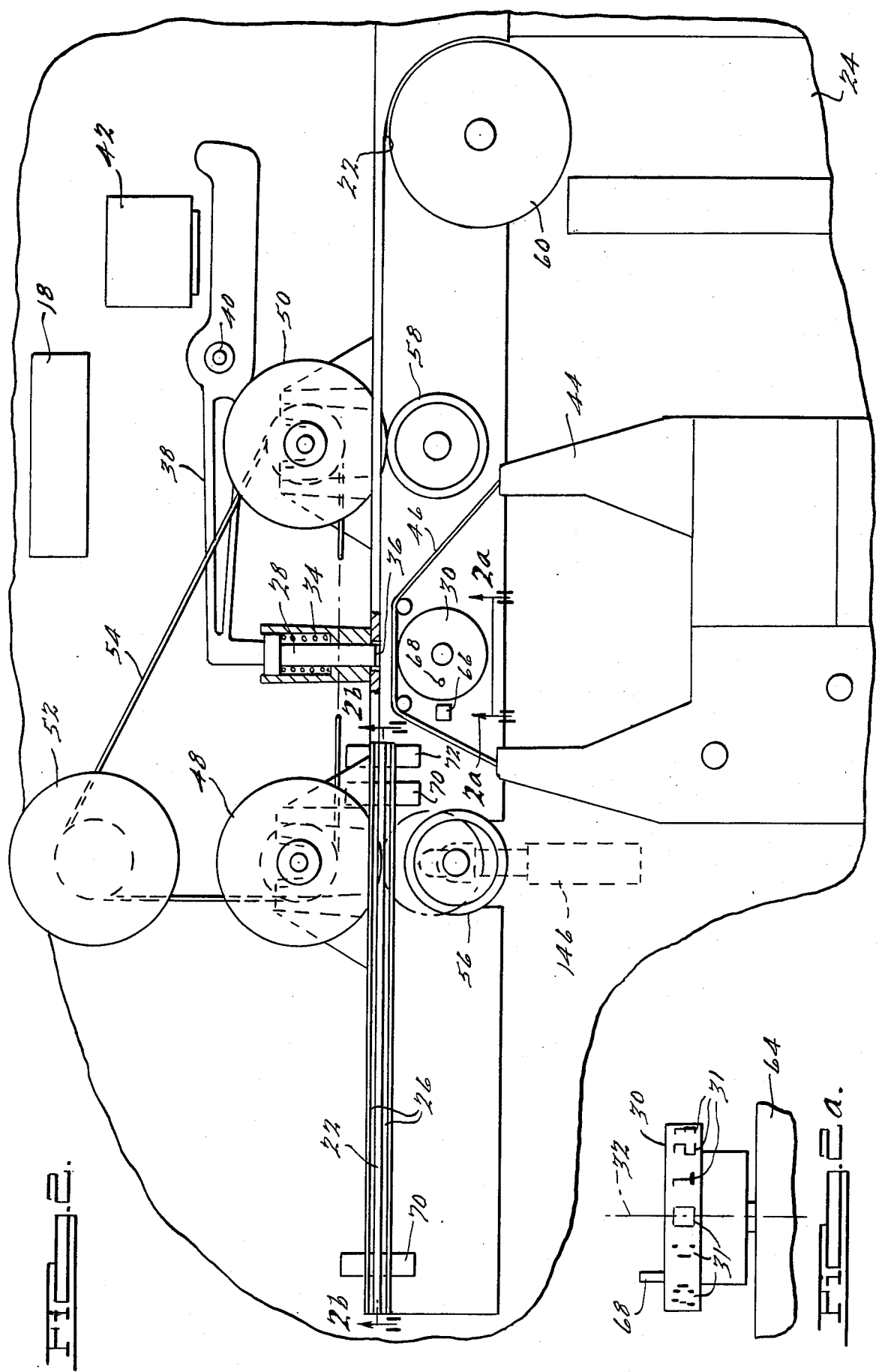

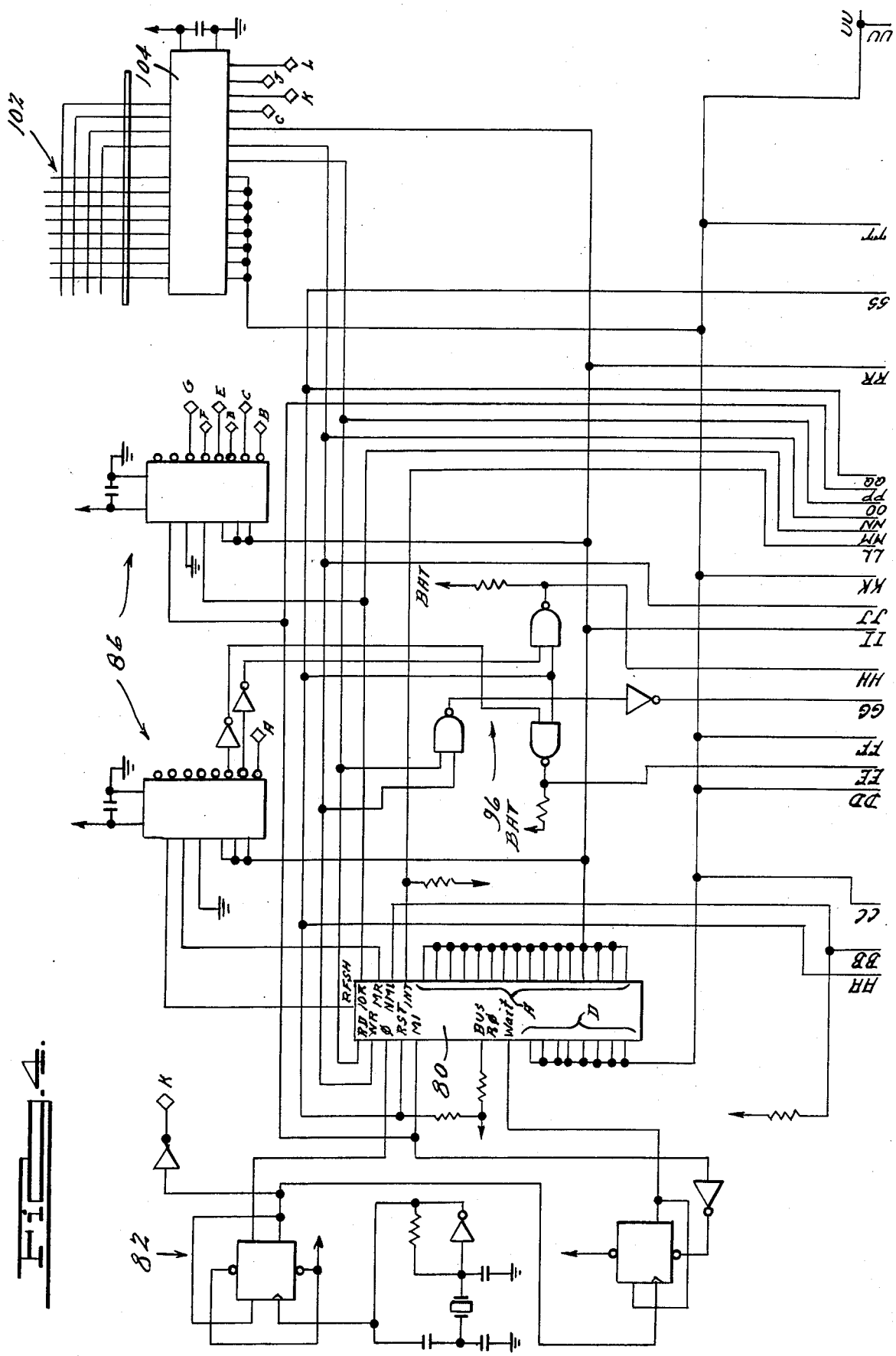

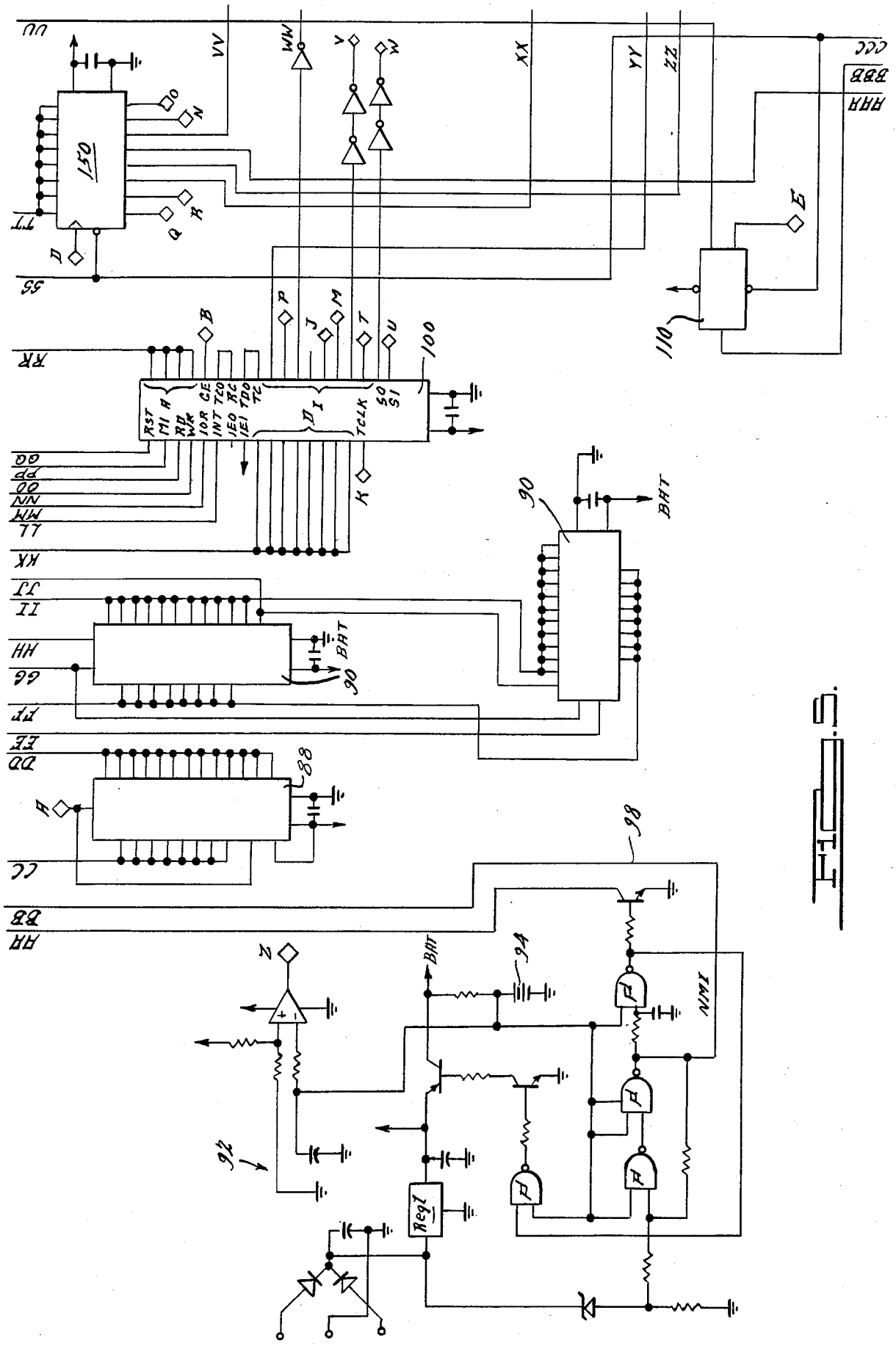

MICR PRINTER

BACKGROUND AND SUMMARY OF THE INVENTION

This invention relates generally to printing equipment for encoding magnetic ink character recognition (MICR) characters on documents such as checks, commercial paper, and the like. More particularly, the invention relates to a high speed desk top MICR printing apparatus for use by bank tellers, point of purchase check-out register operators, bookkeeping departments, and the like, in recording magnetic ink character recognition symbols and characters in the predetermined fields along the bottom edge scan line or band reserved for MICR printing.

It is customary in the banking industry to encode checks, deposit slips and other commercial paper with machine readable magnetic ink charactes to facilitate the processing of financial transactions by machine. In order to insure compatibility throughout the banking industry, such machine readable information must be printed in conformance with very strict standards. If such standards are not adhered to the check or other document will not be machine processable and may have to be manually-handled—a very expensive and inefficient proposition.

In the case of checks, deposit slips and other financial transaction documents, a band along the lowermost edge of the document is reserved for MICR encoded information. The printing requirements for encoding MICR characters in this band are quite stringent and well documented in the literature. These stringent printing requirements are to some extent dictated by the sensitivity of the machines which read and sort MICR encoded documents. Also strict tolerances make falsification of financial documents more difficult. Generally speaking, when documents are rejected by the reader-sorter machine as being unreadable, some of the reasons for these rejects include: document size not meeting the standards for MICR sorting devices; density of ink too low or too high; MICR characters incorrectly positioned or spaced; presence of extraneous ink; symbols omitted; incorrect symbols used; inverted characters; other than MICR information printed in magnetic ink in the 1.59 cm (⅝ in.) reserved MICR band; presence of voids in characters; improper paper weight; and average edge tolerance not being acceptable for the reader-sorter.

Rejected documents must be taken out of the stream and sorted and entered by hand—a process estimated more than six times as expensive as automatic handling. Accordingly, printers for encoding MICR information on financial transaction documents must be capable of producing highly accurate and repeatable results. Printers heretofore available have achieved such accuracy and repeatability at the expense of printer speed.

The present invention provides a desk top MICR printing apparatus which will encode MICR information on the financial transaction documents well within the accuracy and repeatability tolerances required by the banking industry and at speeds not heretofore achieved by desk top units. In accordance with the invention the document printer comprises a print wheel rotatable about an axis having a plurality of raised characters disposed at predetermined angular positions about the periphery of the wheel. An electrically actuable print hammer is disposed radially of the print wheel and operates between retracted and print wheel impacting positions. A document transport mechanism supports the document along the bottom edge thereof and operates to transport or move the document in a direction parallel to the bottom edge, so that it passes between the print wheel and the print hammer. A print wheel stepper motor rotates the print wheel in incremental angular steps about the print wheel axis and includes a means for selectively positioning one of the raised characters in registration with the print hammer.

The print wheel stepper motor is driven by a motor driver which includes a means for determining which of the raised characters is in present registration with the print hammer and for further determining which of the raised characters is next to be printed. The motor driver further includes a means for determining the number of incremental angular steps needed to rotate the print wheel to a position where the next to be printed character is in registration with the print hammer. The motor drive means also includes a means for generating a plurality of current pulses for driving the print wheel stepper motor. The plurality of current pulses are generated at time intervals determined in accordance with the number of incremental angular steps needed to rotate the print wheel to its next printing position. The print wheel is stepped from its present or initial position to the next printing position at a rate which increases incrementally or accelerates from an initial rate or cold start rate to a maximum rate determined by the number of steps needed to rotate the wheel from its initial or present position to the next character to be printed position. As the print wheel nears the next character to the printed position, the driver incrementally decreases the step rate to decelerate the print wheel back towards the cold start rate. In this fashion, maximum speeds are achieved, accurately and without losing synchronism with the stepper motor.

BRIEF DESCRIPTION OF THE DRAWINGS

FIG. 2 depicts the document drive and printer mechanism of the invention in plan view with cabinet removed;

FIG. 2a is a view of a print wheel;

FIGS. 4–9 illustrate the electronic circuit diagram of the invention; and

DESCRIPTION OF THE PREFERRED EMBODIMENT

Figure 3:
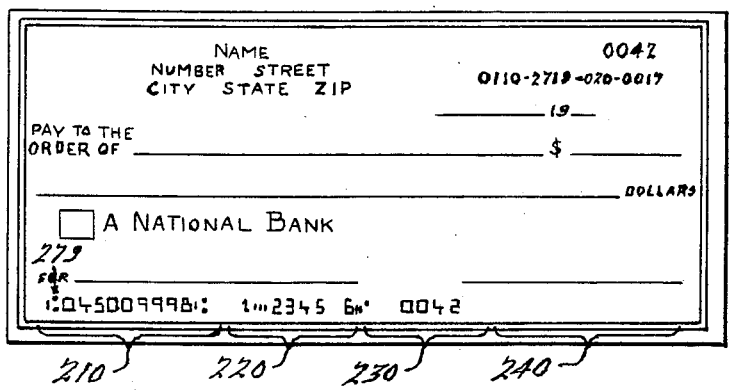
FIG. 3 illustrates a typical financial document, showing the location of the reserved MICR fields in the reserved band along the bottom edge of the document.
Figure 6:
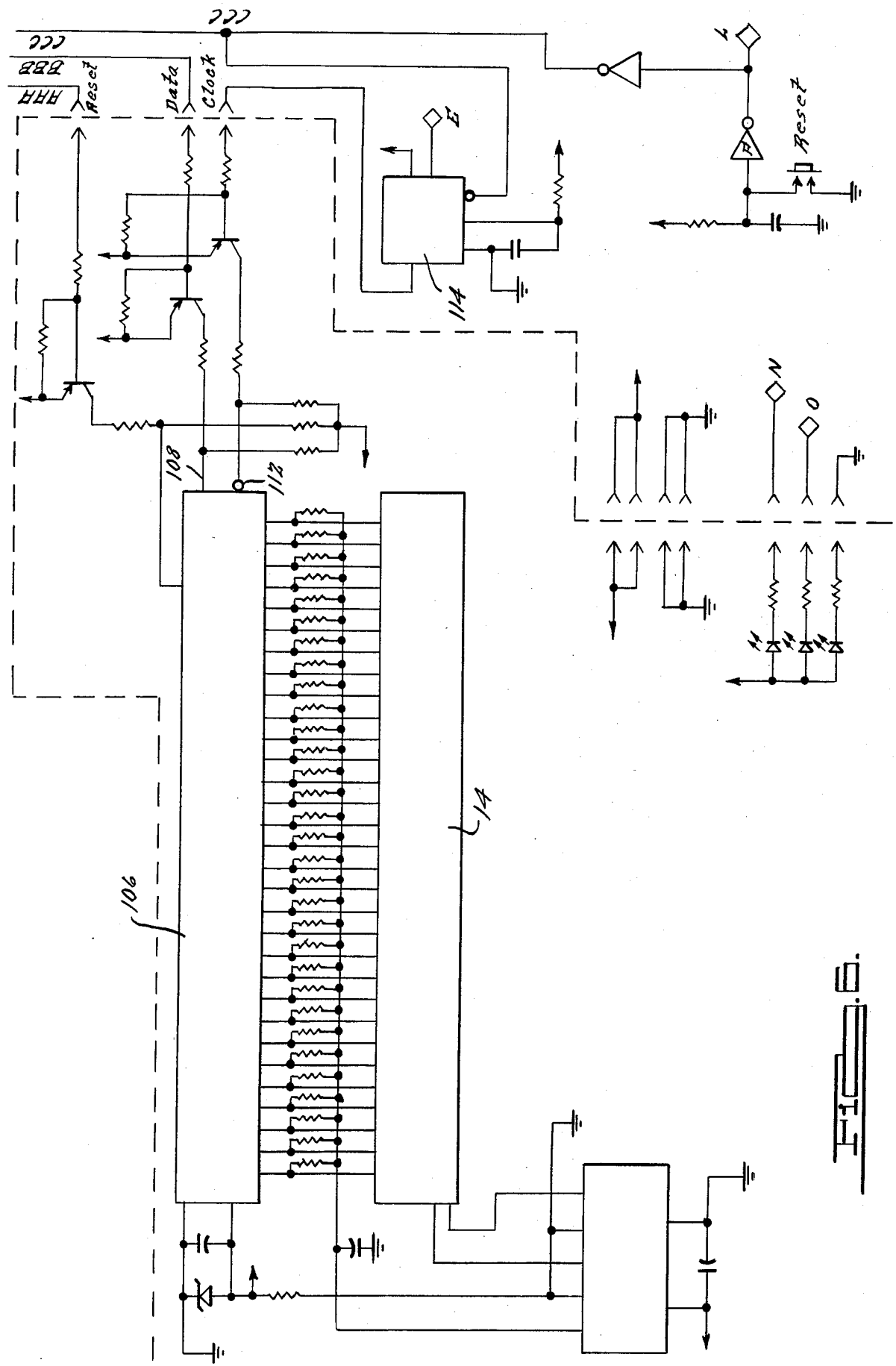
Figure 7:
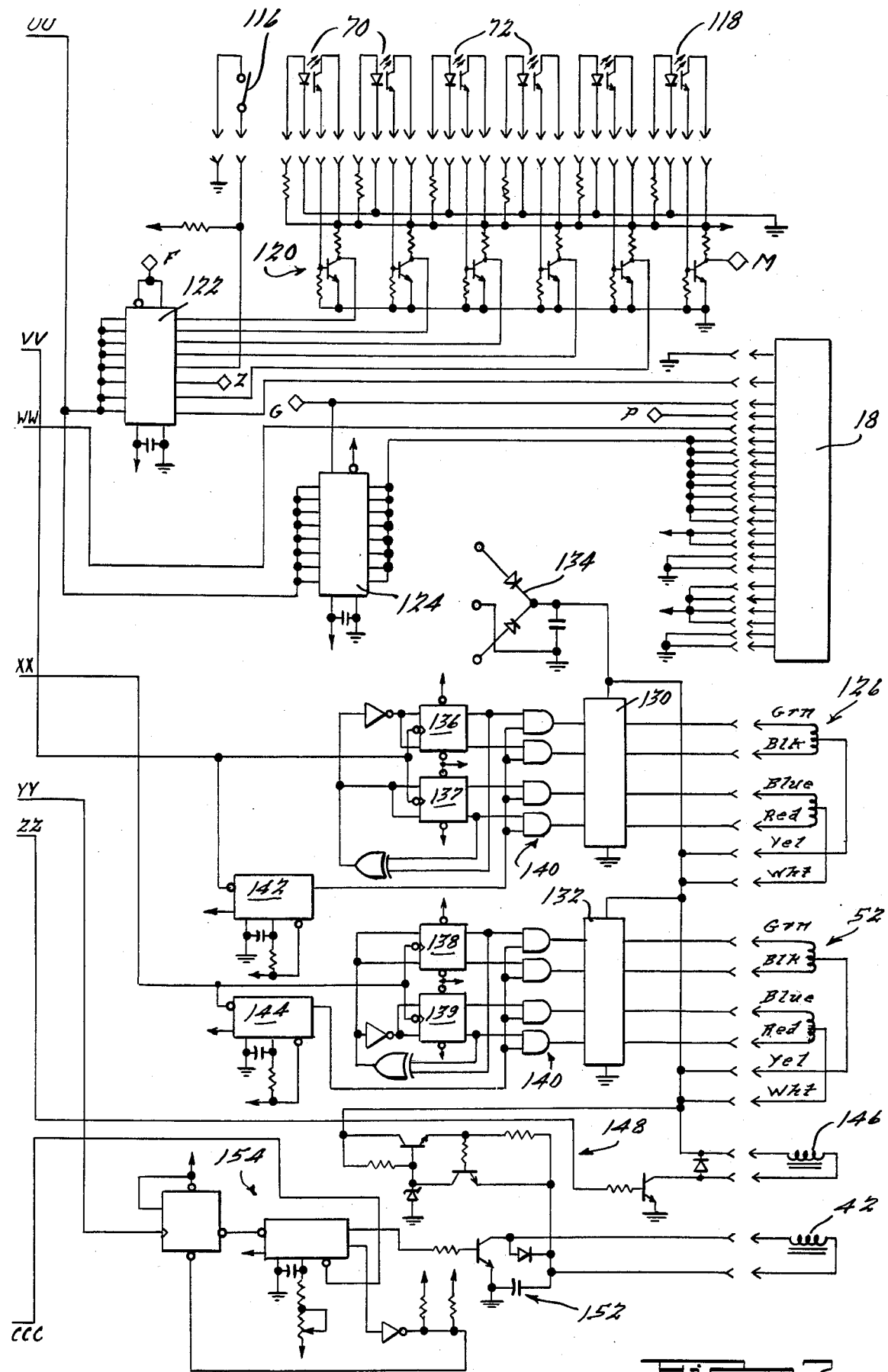

The present invention is adapted for printing MICR alphanumeric and special characters on documents, such as the financial transaction document illustrated in FIG. 3. As illustrated, MICR characters are usually printed in a band comprising several printing fields located along the bottom edge of the document. In accordance with customary banking industry practice these printing fields or MICR fields are designated, Auxiliary On Us field 210; Transit Number field 220; On Us field 230; and Amount field 240. Each such field has a different purpose, as suggested by the name designations. The fields are distinguished from one another by their physical location within the MICR printing band.

Figure 1:
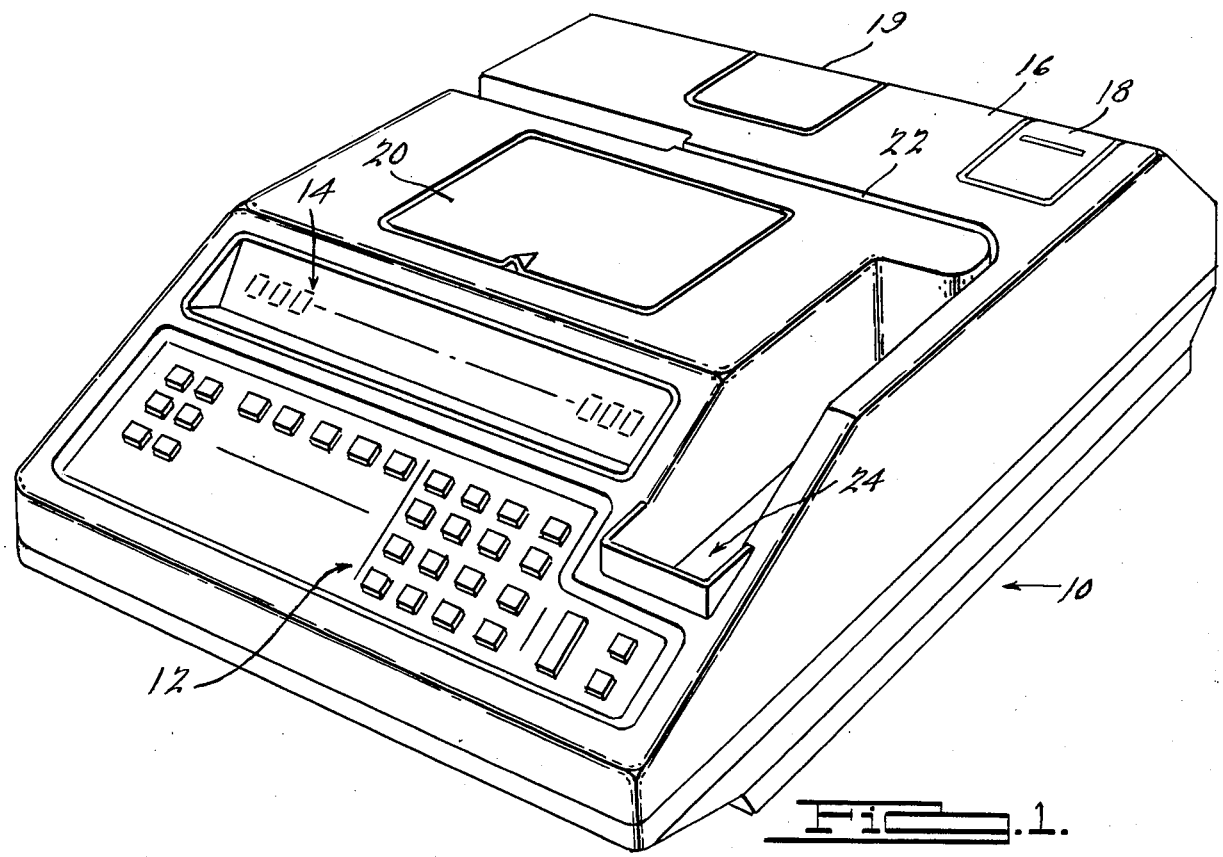
FIG. 1 is a perspective view of the MICR printing apparatus of the invention.

Referring to FIG. 1, the MICR printing apparatus of the invention is illustrated generally at 10. MICR printer 10 includes keypad 12 for manual data entry and an alphanumeric display 14 for visually displaying information to be placed in the various MICR fields. At the rear of cabinet 16 is a journal printer 18, used to provide a paper tape print out of each transaction that is processed through the MICR printer 10. At the top rear of cabinet 16 a removable door 19 is provided which may be opened to permit replacement of the print hammer. The top of cabinet 16 includes a removable door 20 which may be opened to permit the operator to replace a removable MICR printer ribbon cartridge or cassette. Also disposed in the top of cabinet 16 is a slotted document transport track 22 through which documents travel while being printed upon. Document movement is from left to right in FIG. 1. Once printed upon, the documents are ejected into holding receptable 24.

Figure 2B:
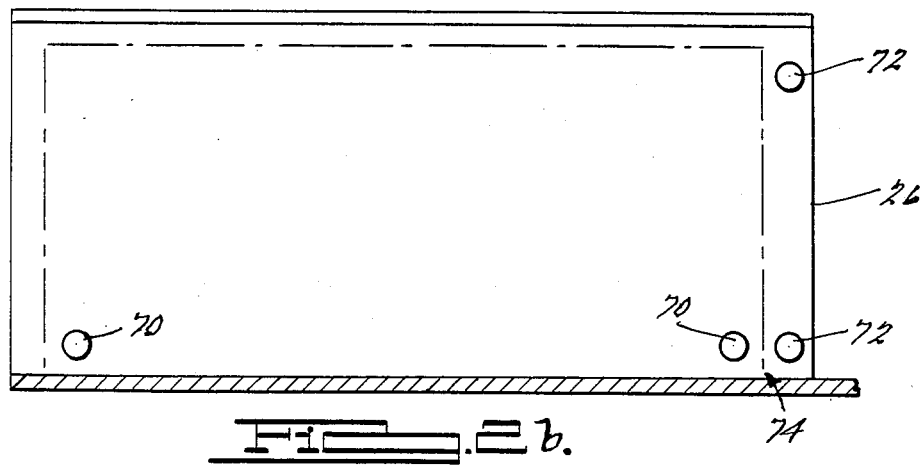
FIG. 2b is a view of a print wheel and support guides.

FIG. 2 depicts the document drive and printer mechanism of the invention in plan view with cabinet 16 removed. Document transport track 22 includes closely spaced document support guides 26 disposed on the document feed side (left side) next to print hammer 28 and print wheel 30. Support guides 26 are also shown in FIG. 2b. Print wheel 30 is further illustrated in FIG. 2a. Print wheel 30 is journaled for rotation about wheel axis 32 and includes a plurality of raised characters 31 disposed about the outer cylindrical periphery at equally spaced angular positions. Hammer 28 is disposed radially apart from print wheel 30 and is movable between a relatively retracted position (shown in FIG. 2) and a print wheel impacting position. Hammer 28 is biased toward its retracted position by bias spring 34. The tip 36 of hammer 28 is preferably constructed of a plastic material to prevent the hammer from damaging print wheel 30 and also to reduce printer noise. Hammer 28 is urged toward its print wheel impacting position by rocker arm 38 journaled on pivot pin 40 and actuated by hammer solenoid 42.

Print wheel 30 and hammer 28 are disposed so that hammer tip 36 will impact one and only one of the raised characters on the outer periphery of print wheel 30 when solenoid 42 is actuated. The document support guides 26 and document track 22 support the check or other document to be printed so that the band along the bottom of the check or document which is reserved for MICR character information will pass between print wheel 30 and hammer 28. A ribbon cartridge 44 supplying magnetic ink bearing ribbon 46 is positioned as shown in FIG. 2 so that ribbon 46 is disposed adjacent the outer periphery of print wheel 30. MICR characters may be printed in the reserved MICR band at the bottom of a check or other document by positioning the check or document between print wheel 30 and hammer 28, rotating print wheel so that the desired character faces hammer tip 36, and by then energizing hammer solenoid 42 causing hammer tip 36 to impact the check or document, driving it into ribbon 46. This impact causes magnetic ink to be deposited on the surface of the check or document as dictated by the raised character.

The document transport system, which includes document track 22 and support guides 26, further includes a pair of drive wheels 48 and 50. Drive wheels 48 and 50 are journaled for rotation and belt driven by transport stepper motor 52 with belt 54, arranged as shown in FIG. 2. Drive wheels 48 and 50 rotate in a counter clockwise direction as viewed in FIG. 2 so that documents positioned within track 22 will move in a direction from drive wheel 48 to drive wheel 50. Drive wheels 48 and 50 are each provided with capstans or pinch rollers 56 and 58, respectively. Pinch rollers 56 and 58 preferably have rubber tipped outer circumferences for engaging the drive wheels and for providing sufficient friction to grip the check or other document as drive wheels 48 and 50 rotate to transport the document past the print wheel and hammer assembly. Capstan 56 is held in a normally retracted position, apart from drive wheel 48, to permit insertion of the document to be printed. Drive solenoid 146 engages capstan 56 with wheel 48 when the document is positioned between capstan 56 and wheel 48.

The document transport system further includes a high speed wheel 60, which rotates in a clockwise direction when viewed in FIG. 2 to eject the document into receptacle 24 after it has completely passed the print wheel and hammer assembly. High speed wheel 60 is preferably driven at a continuous speed by a DC or AC motor, or the like. Print wheel 30 is driven by print wheel stepper motor 64 (shown in FIG. 2a). A print wheel position sensor 66 is used to determine the angular position of print wheel 30 relative to hammer 28. The print wheel position sensor may be implemented to using an optical sensor responsive to an index marking or pin 68 disposed at a predetermined position on print wheel 30. The print wheel position sensor provides information used to determine which of the raised characters is in registration with print hammer 28.

The document transport system includes a number of additional sensors for insuring that the document is properly positioned within track 22 prior to printing. These sensors include a pair of horizontal sensors 70, implemented using optical sensors, for determining whether the document is resting flat within track 22 along its lower edge. A pair of vertical sensors 72, also implemented using optical sensors, examine the leading edge of the document to reject documents having a dog-eared or torn leading edge lower corner. Present day MICR reading and sorting machines initialize upon this lower leading edge, and hence this edge must not be damaged if the document is to be processed by machine. Insert FIG. 2b illustrates sensors 70 and 72 as viewed from the side of the document. The lower leading edge of the document is indicated at 74. Vertical sensors 72 also provide an indication of the precise location of the document for use by the print computer apparatus in determining when to commence printing. Also diagrammatically illustrated in FIG. 2 is journal printer 18.

Referring now to FIGS. 4 through 9, the circuit diagram of the invention is illustrated. The circuit is implemented using a microprocessor 80 such as a Z80 microprocessor or the like. Clock signals are provided by crystal controlled clock generator 82 in the usual fashion. Microprocessor 80 is coupled to address decoder device select circuit 86 implemented to using 74LS138 integrated circuits. The device select circuit 86 is responsive to signals placed on the address bus by microprocessor 80 and produces device select output signals for switching other devices within the circuit on or off under software control. The alphabetic character designations depicted on the various output leads of device select circuit 86 represent connection points to other devices within the circuit. For example, the output lead designated by the character "A" is coupled to the chip enable lead bearing a similar "A" designation of ROM memory chip 88. ROM memory 88 (FIG. 5) is used to store the program or sequence of instructions for controlling the operation of the microcomputer circuit of the invention. In addition to ROM memory, the invention further includes random access memory in the form of RAM 90. ROM 88 may be implemented using a 2764 memory chip to provide 8K bytes of eight bit storage, while RAM 90 may be implemented using a pair of 2K byte eight bit RAM memory chips, such as 5516 memory chips.

To insure that data stored in the RAM memory is not lost when the power is off, a battery power supply back-up circuit 92 (FIG. 5) is provided. The power supply back-up 92 includes a rechargeable battery 94. Logic gates 96 (FIG. 4) prevent RAM memory from being activated when battery back-up power is on. This feature insures that erroneous data is not accidentally written to the RAM memory. The power supply back-up 92 also includes a nonmaskable interrupt line 98 for providing a high priority interrupt to the microprocessor 80. If a power failure occurs, the nonmaskable interrupt is issued, followed by reset, causing the microprocessor to save critical information during the few milliseconds before operating power drops below usable levels.

A serial timer interrupt controller circuit 100 (FIG. 5) is coupled to the microprocessor 80 providing a plurality of separate interrupt lines designated $I_0$–$I_7$ and also providing serial input and output lines designated SI and SO, respectively. Serial timer interrupt controller 100 may be implemented using a 3801 integrated circuit which provides a plurality of input/output lines as well as the interrupt lines and serial lines referred to above. The circuit further includes an asynchronous transmitter and receiver circuit such as a USART as well as a plurality of timers and a baud rate generator. Controller 100 is coupled via the interrupt lines $I_0$–$I_7$ to a plurality of different devices throughout the circuit as indicated by the alphabetic characters.

Keypad 12 is coupled to keypad matrix 102 (FIG. 4), which is in turn coupled to keyboard encoder 104. Encoder 104 may be implemented using an 8279 integrated circuit for connection to the data bus of microprocessor 80. Alphanumeric display 14 (FIG. 6) is implemented using a vacuum fluorescent display such as a FUTABA 16-MY-01 display or the like. Display 14 is driven by display driver 106, which may be implemented using a 10937 integrated circuit. The data input port 108 of driver 106 is responsive to data on the $D_0$ data line via flip flop 110 (FIG. 5). The clock input port 112 of driver 106 is receptive of clock signals processed through one shot monostable multivibrator circuit 114 which receives clock pulses and extends the duration of those pulses so as to be compatible with the vacuum fluorescent display clocking requirements.

The circuit of the invention includes a plurality of optical sensors and mechanical sensors for providing information with respect to the positioning of the document to be printed and with respect to the angular position on print wheel 30, and also with respect to the ribbon supply status. More specifically, ribbon cartridge sensor 116, implemented using a mechanical-type microswitch, or the equivalent, is used to sense when the ribbon cartridge 44 has been removed. An optical end of ribbon sensor 118 senses when the ribbon cartridge is spent and needs to be replaced. A pair of horizontal sensors 70, discussed more fully above, are implemented using optical sensors, as are the pair of vertical sensors 72. The optical sensors are each coupled through switching transistor drives 120 to a sensor latch circuit 122. The ribbon cartridge sensor 116 is coupled directly to sensor latch 122. When selected by lead F of device select circuit 86, the sensor latch 122 provides information to microcomputer 80 via the data bus concerning the status of the various sensors.

The invention further provides a number of output signals for controlling the various stepper motors, solenoids and other electromechanical devices. For instance, journal printer 18 is coupled through latch 124 to the data bus of microcomputer 80 to receive the numerical data to be printed on the journal paper tape. Journal printer 18 may be implemented using a commercially available dot matrix printer element together with its associated printer controller circuitry. Journal printer 18 is responsive to microcomputer 80 to print a paper tape listing of journal entries as they are being entered and processed by the human operator. Journal printer 18 is also responsive to microcomputer 80 to print out journal entries stored in RAM memory. In this fashion, extra copies of the paper tape journal record may be printed without using carbon paper. This is a decided advantage in that any number of multiple copies of the paper tape journal entry may be printed, whereas only a limited number of carbon copies may be made due to the inherent limitations of impact printing through multiple pages. Moreover, because impact energy is not needed to print through several layers of paper tape and carbon paper, the dot matrix printer head can be smaller, lighter duty, faster and less expensive.

The ribbon stepper motor 126 and document transport stepper motor 52 are both implemented using 24 volt DC two phase motors. These stepper motors employ windings at the four 90° quadrants and have four corresponding leads, designated GRN, BLK, BLUE, and RED. The coils are center tapped to provide additional leads denoted YEL and WHT. Ribbon motor 126 is driven using a driver circuit 130, and document transport motor 52 is similarly using driver circuit 132. Both driver circuits may be implemented using ULN-2069B integrated circuits coupled to a 24 volt DC supply 134. Driver circuits 130 and 132 are each controlled by a pair of flip flops 136, 137 and 138, 139, respectively. The pair of flip flops effect a sequencer circuit for alternately driving the two pairs of windings of the corresponding stepper motor. The outputs of flip flops 136, 137 and 138, 139 are processed through logic gates 140 responsive to a one shot monostable multivibrator circuit 142 and 144, respectively, to disable the sequencing circuit, removing power from the stepper motors after the lapse of a predetermined time interval.

In addition to the stepper motors described above, the invention further includes a drive solenoid 146 which, when energized, engages capstan 56 with drive wheel 48. When disengaged, the capstan 56 is disposed apart from drive wheel 48 to permit insertion of the check or document into track 22. Drive solenoid 146 is driven by transistor driver circuit 148 in response to signals from latch 150 (FIG. 5) under microcomputer control. When the document has cleared drive wheel 48 (as determined by optical sensors 72) capstan 56 is disengaged. The hammer solenoid 42 is likewise controlled by a transistor driver circuit 152 under control of latch 150. Transistor driver circuit 152 also includes an adjustable delay timer circuit 154 which determines how long the hammer solenoid is energized, thereby controlling the impact energy of the hammer.

Figure 8:
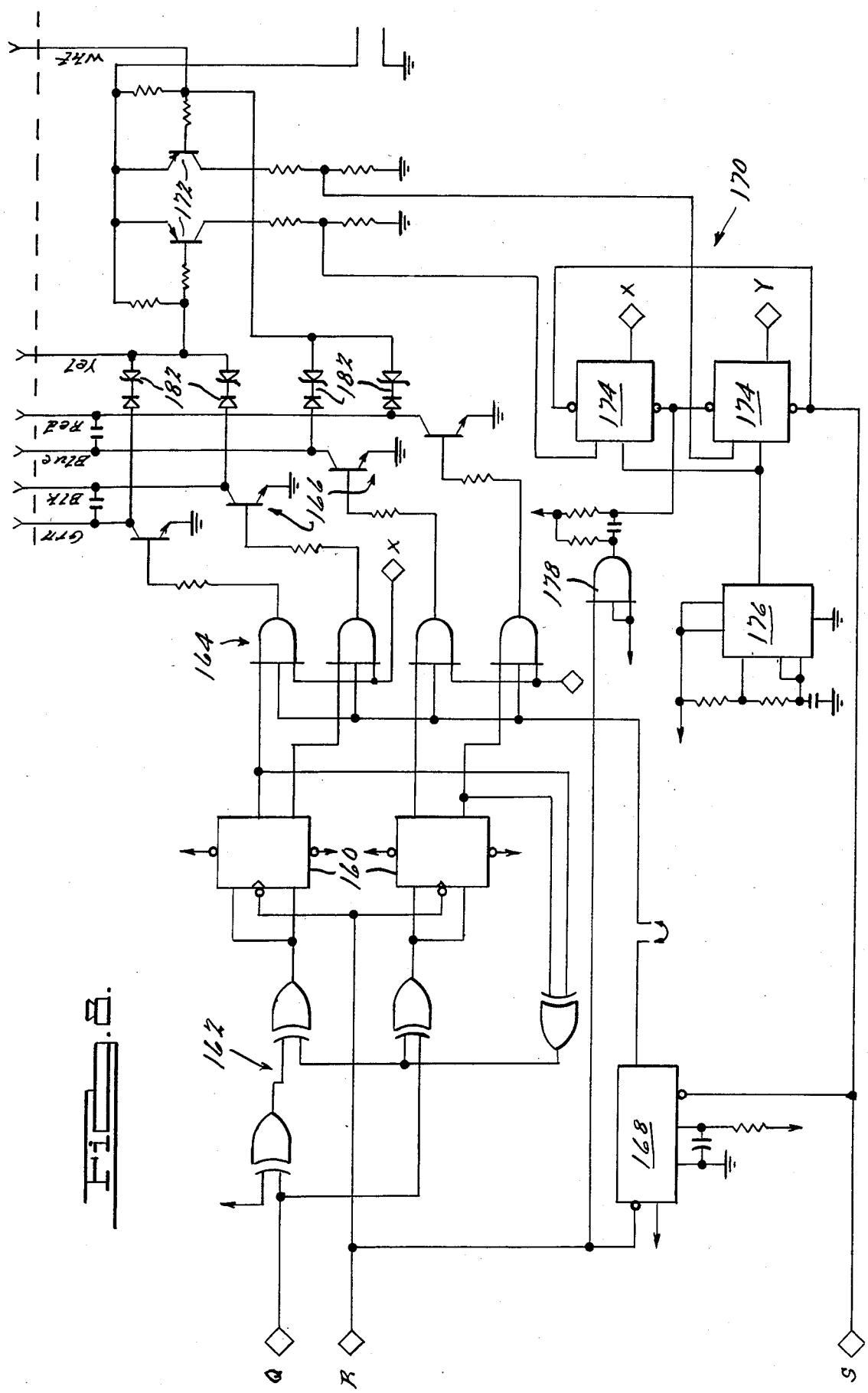

The print wheel motor drive circuit is illustrated in FIG. 8. The print wheel stepper motor 64 is preferably implemented using a 12 volt stepper motor driven in a current limited mode at 24 volts. Excitation of the 12 volt motor at current limited 24 volts allows the motor to respond more quickly without risk of burn out. The connection points to stepper motor 64 are designated GRN, BLK, BLUE, RED, YEL, and WHT. The leads designated YEL and WHT are center tap connections. A pair of flip flops 160 comprise a sequencer circuit for sequentially driving the coils of print wheel stepper motor 64. Flip flops 160 are responsive to step commands issued by the microprocessor via latch 150 (FIG. 5) on lead R. The flip flops 160 will cause the stepper motor to step in either a clockwise direction or a counterclockwise direction determined by the programmable inverter circuit 162. Programmable inverter circuit 162 comprises a plurality of exclusive OR gates coupled to the Q terminal of latch 150. The programmable inverter circuit is responsive to print wheel rotation direction commands from microprocessor 80. The outputs of flip flops 160 are coupled through AND gates 164 and driver transistors 166 to the motor winding terminals as shown. AND gates 164 are also coupled to the output of one-shot multivibrator 168 which conserves power by turning off drive current after a predetermined time (approximately 200 milliseconds) after a motor stepping sequence is completed. AND gates are also coupled to pulse width modulator circuit 170 which provides the current limited operation referred to above. More specifically, transistors 172 monitor the current flow through center tap windings YEL and WHT. When current flow exceeds a predetermined level in either transistor, one of the pair of flip flops 174 is caused to change state, thereby turning off the appropriate AND gates 164. When this occurs, current in the center tap winding begins to fall until it drops below the predetermined level, whereupon flip flops 174 change state to reactivate the AND gates 164. The current limiting circuit works in conjunction with a pulse width modulation oscillator 176, which produces approximately 10 to 20 pulses during each motor step (i.e. approximately 18 KHz). A reset circuit 178, responsive to the motor step command on lead R arms flip flops 174 as soon as a step command is received, to insure that the current limiting circuit is ready to operate immediately, regardless of where in its cycle the pulse width modulation oscillator 176 happens to be. To protect transistors from being damaged by inductively stored energy, and to insure that the transistors are turned off quickly, zener diode snubber circuits 182 are used to dissipate the energy stored in the motor windings.

Figure 9:
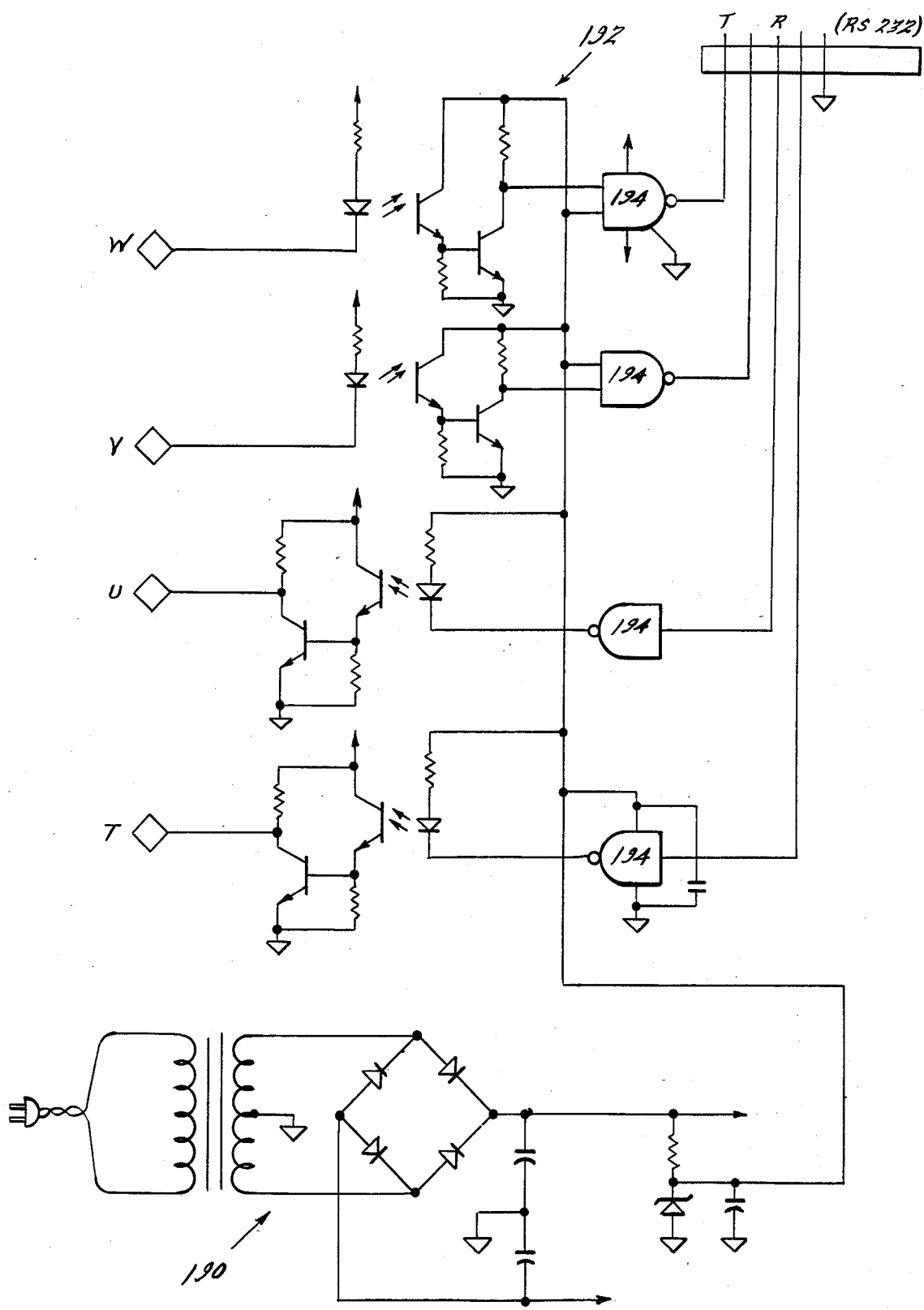

FIG. 9 shows the power supply circuit 190 and a serial port interface circuit 192 useful in connecting the microprinter to an external computer via hardware or modem communication link. The serial port interface circuit is optically isolated so that the serial port can be coupled to long transmission wires without grounding problems. The optical isolation also prevents interconnection cables from behaving as radio receiving or transmitting antennas. LOGIC gates 194 are used to match signal levels to the EIA RS 232 standards for serial communication.

Referring now to the flow chart diagrams of FIGS. 10 and 11, the detailed description of the print wheel driver and document transport operation will be given. The serial timer interrupt controller circuit 100 provides two timer interrupts, designated timer A and timer B. The timer A interrupt is of higher priority than timer B. In the presently preferred embodiment the timer A interrupt is used to control the print wheel stepping while the timer B interrupt is used to control the document transport stepping. The two interrupt routines effect a hand-shaking protocol to insure proper coordination between print wheel and document transport.

Figure 10:
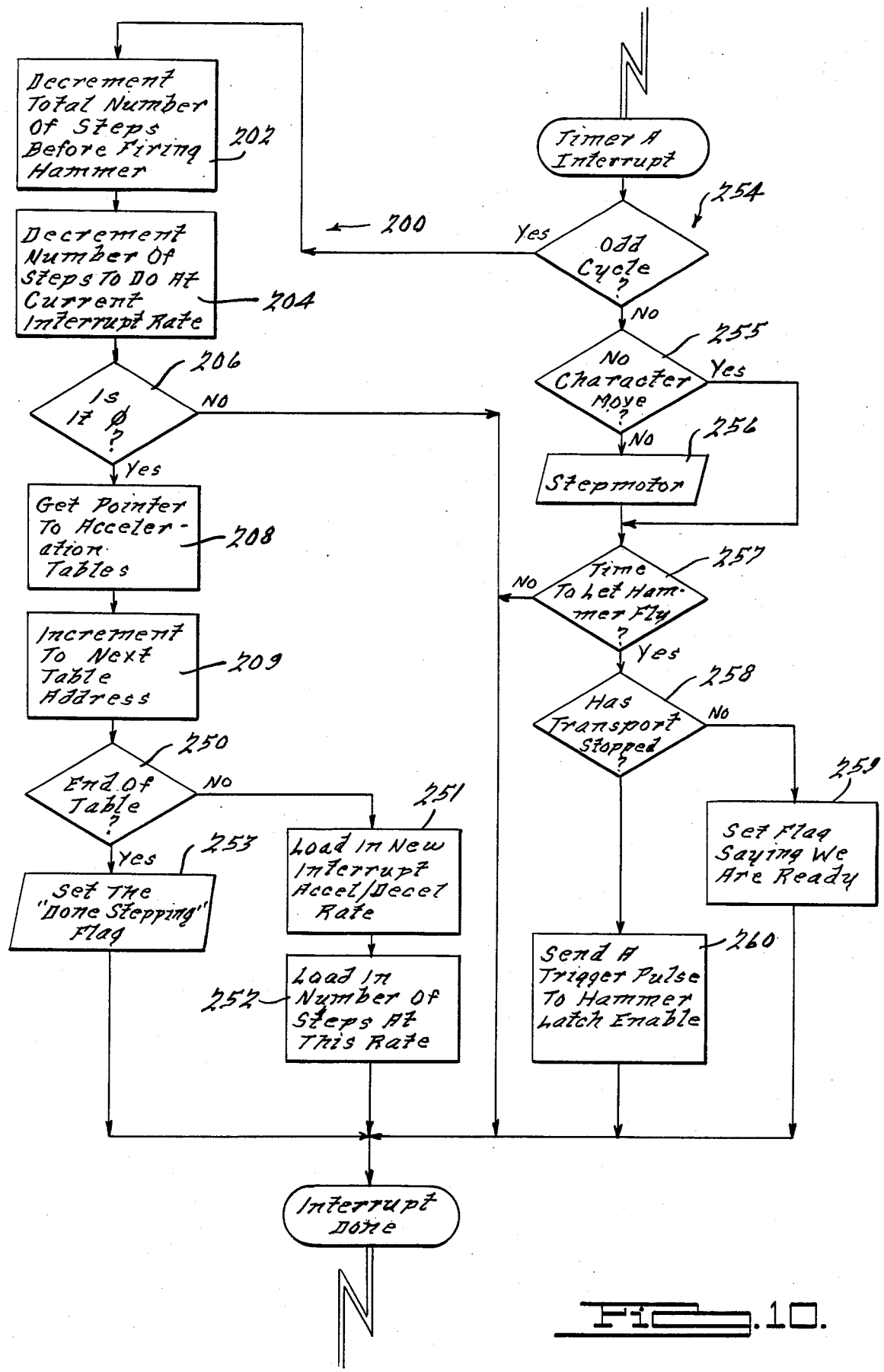
FIGS. 10 and 11 are flow chart diagrams describing the operation of the print wheel stepper motor and document transport stepper motor.

Referring to FIG. 10 the timer A interrupt routine begins by dividing its operation into two parts or branches, an odd cycle and an even cycle. One branch (200) loads print wheel acceleration and deceleration values stored in look-up tables for use in controlling print wheel stepping rates. The other branch (254) determines when to fire the hammer solenoid. While the flow chart description of the invention uses an odd cycle/even cycle test to branch or toggle between routines, other branching techniques are also useable.

Following the acceleration/deceleration rate determining branch 200 of the timer A interrupt, a total number of steps counter is decremented, step 202, and then a counter holding the number of print wheel steps at the current rate are decremented, step 204. Step 202 thus keeps track of the number of physical steps required to rotate the print wheel from its present position to the position at which the next character to be printed is in registration with the hammer. Step 204 helps implement the step rate ramp mechanism whereby acceleration and deceleration rates are dynamically determined based on how far the print wheel must rotate to its next position. In step 206 the routine tests to determine whether the number of steps at current rate counter is zero. If the counter value is not zero, the current acceleration and deceleration values remain in effect and control exits from the interrupt service routine. If the counter is zero, new acceleration and deceleration values are loaded by causing a pointer to point to a new memory location for offset within the acceleration/deceleration look-up tables, step 208.

The look-up tables may reside in a contiguous block of memory, or several separate blocks of memory, and consists of a sequence of timer count-down rates which are written to the serial timer interrupt controller 100 to control the rate at which the timer A hardware interrupt occurs. In the presently preferred embodiment the look-up table may be configured as a plurality of individual look-up tables, one table for a one character move, another table for a two character move, a third table for a three character move, and so forth. Each such individual interrupt table may include an end of table delimiter to separate one table from the next. Preferably groups of timer count-down rates are stored in consecutive memory location or linked memory locations so that the next consecutive timer value may be relatively determined based on the previous value.

Once the pointer has been set to the appropriate look-up table entry point in step 208, the pointer is incremented to the next table address in step 209 and a test is made to determine whether that next address contains an end-of-table delimiter, step 250. If the table end delimiter is not detected, a new interrupt count-down rate is loaded, step 251, and the number of steps at this rate is loaded in step 252. The previously discussed step 204 and step 206 are later used to decrement and interrogate this number of steps counter as was discussed above.

Once the new rate and number of steps values have been loaded, control exits from the interrupt service routine. If an end-of-table delimiter is encountered, a "done stepping" flag is set, step 253. This "done stepping" flag is used in the hammer firing branch 254 of the timer A interrupt routine, as will be discussed momentarily. Having set the "done stepping" flag, control exits the interrupt service routine.

With the occurrence of the next timer A hardware interrupt (occurring at the rate determined by branch 200), control branches through branch 254 of the timer A interrupt routine. The routine in step 255 tests whether the requested next character is a repetition of a previous character, in which case control branches around step 256, the step motor command. The step motor command 256 causes the print wheel to index one step by activating the R line of latch 150. Next the routine, in step 257, interrogates the "done stepping" flag to determine if it is time to let the hammer fly. If the "done stepping" flag is not set, the interrupt service routine is exited at step 257. On the other hand, if the "done stepping" flag is set, the routine interrogates the "transport stopped" flag (step 258) which is set by the timer B interrupt routine discussed below. It is at this point that the timer A interrupt routine and the timer B interrupt routine hand shake with one another, so that the print wheel movement and the document transport system work in synchronism with one another. If the "transport stopped" flag is not set, the timer A interrupt service routine sets a "print wheel ready" flag (step 259) which is used to effect hand-shaking with the timer B interrupt routine. Control then exits the timer A interrupt routine. If the "transport stopped" flag is set, the hammer solenoid is energized by step 260 and control then exits the timer A interrupt routine. From the foregoing it will be seen that the timer A interrupt routine toggles between two control branches, one determining the rate at which timer A interrupts occur, and the other controlling the print wheel stepper motor and the hammer solenoid.

Figure 11:
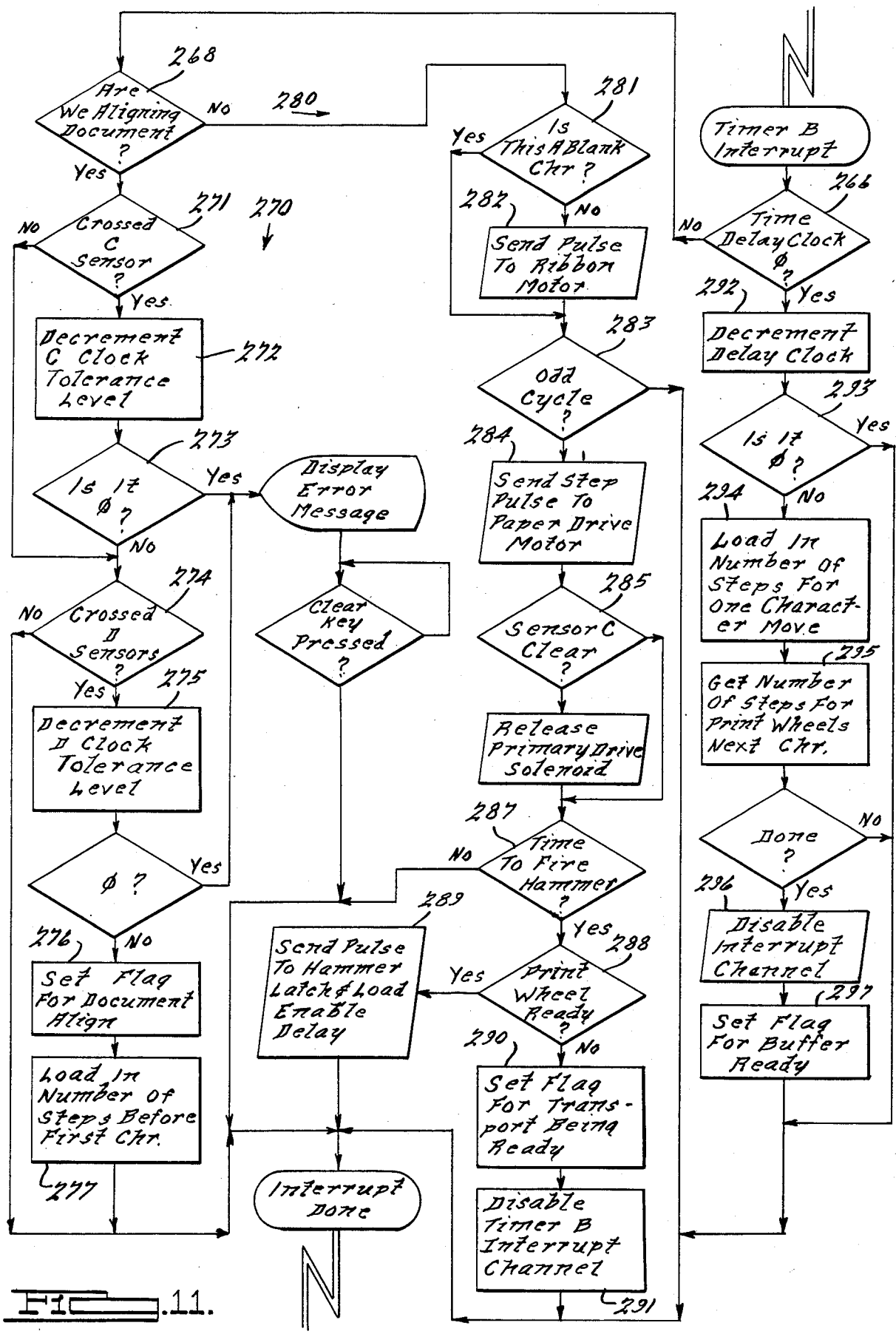

The timer B interrupt routine is illustrated in FIG. 11. As noted above, the timer B routine is a lower priority interrupt than the timer A interrupt, thus if both interrupts occur at the same time, the timer A interrupt takes precedence. The timer B routine begins by interrogating a timed delay clock to see if sufficient timer has elapsed to allow the hammer to return to its retracted position after being fired. This is done by loading a delay clock counter with a predetermined number, decrementing the counter at a predetermined rate and testing the counter to determine when it reaches zero. If the delay clock timer is not equal to zero when interrogated in step 266, control branches to a routine 268 which checks the optical sensors to determine whether the document is properly aligned. If the document has not yet been properly aligned, the routine branches through branch 270 which checks (step 271) to determine whether the document has crossed the C sensor (the uppermost of the vertical sensor pair 72). The lowermost sensor of optical sensor pair 72 is designated as the D sensor. A pair of tolerance level timers, the C timer and the D timer, are loaded with large initial values corresponding to count-down times much greater than the expected time for a moving document to cross the C and D sensors. When the C sensor has been crossed, the C clock is decremented (step 272) and tested to determine if it is equal to zero (step 253). The C clock should never during normal operation reach zero, thus if the value is zero, an error message is displayed, any keys pressed are cleared and the interrupt routine exits. If the C clock is not zero (as expected), the D sensor is then interrogated and the D clock is decremented (steps 274 and 275). If the D clock reaches zero, an error condition is sensed and control branches to the error message routine discussed above. Assuming an error condition is not detected, control branches to step 276 where a "document aligned" flag is set. Next a predetermined number is loaded which corresponds to the number of transport stepper motor steps required to locate the document at the starting character position. This starting character position is indicated at 279 in FIG. 3. Having loaded the number of steps required to reach the first character position, the interrupt service routine is exited.

The timer B interrupt routine is repeatedly called each time the timer B hardware interrupt occurs. Unlike the timer A interrupt, which occurs at a variable rate, the timer B interrupt occurs at a fixed rate in the preferred embodiment. Referring to step 268, assuming that the "document aligned" flag was set during a previous pass through the interrupt service routine, control proceeds through branch 280. If the next character to be printed is a blank character (i.e. a space) control branches around the ribbon motor driver to save ribbon. Otherwise, a pulse is emitted to the ribbon motor driver, causing it to index to the next unused position. Next the routine toggles on odd and even passes through branch 280 (step 283) so that control branches around the document transport motor driver control every other time through the branch. This is done in order to pulse the ribbon drive motor at a more rapid rate than the document transport motor, to compensate for gearing differences between those two motors. When control is not branched around the document transport constructions, a step pulse is emitted to the document transport motor (step 284) and the C sensor is interrogated (step 285) to see whether the document has cleared that sensor. When the document has cleared sensor C, capstan 56 is disengaged from its drive wheel 48 by deenergizing the solenoid 146. This action allows the next document to be placed in the transport track 22 and also saves energy by deenergizing the solenoid.

Following the sensor C test, the routine determines whether it is time to fire the hammer, step 287. If it is not yet time to fire the hammer, the interrupt service routine exits. If it is time to fire the hammer, the routine determines whether the print wheel is properly positioned (step 288), which can be determined by checking the "done stepping" flag. If the print wheel is in position, a pulse is emitted to the hammer latch (step 289) and the time delay counter is loaded with a predetermined value and enabled. This time delay counter, it will be recalled, counts for a sufficient time to permit the hammer to impact and return to its retracted position. If the print wheel is not yet in position, the timer B routine sets a "transport ready" flag (step 290), to effect hand-shaking with the timer A interrupt, whereupon the timer B interrupt channel is disabled (step 291).

Returning to step 266 of the timer B interrupt routine, it will be seen that the foregoing instructions take place when the time delay clock is not zero. During this non-zero time, it is assumed that the hammer is not yet in its retracted position for firing, and the routine decrements (step 292) and tests (step 293) the delay clock in order to branch through one of two logical paths, depending on whether the delay clock value is yet reduced to zero. If it is reduced to zero after step 292, the interrupt routine exits. Otherwise a predetermined number of transport drive steps is loaded (step 294). This predetermined number corresponds to the number of steps needed to displace the document one character space. Once this value has been loaded, the number of character spaces required to reach the next printed character position is determined (step 295). If the printing is completed at this point, the timer B interrupt channel is disabled (step 296) and a flag is set (step 297) indicating that the buffer is ready to receive the next group of characters to be printed. Otherwise, if the final character has not been printed, the routine exits.

In operation, the print wheel is stepped from its present location to the next printed character location at a rate determined by the number of steps required to reach the next printed character location. For movement between adjacent characters on the print wheel, such as movement from "2" to "3", the print wheel is stepped at a start-up rate based on the cold state step rate at which the print wheel stepper motor is capable of responding. Once the print wheel stepper motor is up to speed at the cold start rate, the step rate is then increased further in one or more successive or quantized rate increased stages until the print wheel is approximately midway between the previous printed character and the next printed character. Once the appropriate midpoint has beenn reached, the step rate is decelerated or reduced in quantized steps until the cold start rate is again reached. It will be understood that the print wheel is driven at a given gear reduction, thus even a single character move will require a plurality of stepper motor steps. In the presently preferred embodiment the top speed (full acceleration) is reached by moves between characters displaced by 4 characters or more. The longest move, a 10 character move, corresponds to a 180° rotation of the print wheel.

Referring to the acceleration look-up tables in the Appendix, the program sequence for each character move from a zero step move to a ten step move, is given. Each program sequence begins with a caption, such as MOVE_1, MOVE_2, and so forth. Next, a table header is listed: DEFB 10, DEFB 20, and so forth, followed by the program sequence. Referring to the one step sequence, the timer A interrupt rate is given as 255. The number of steps to do at this interrupt rate is given as 4. Thus, when the timer A interrupt routine of FIG. 10 executes, the number of steps at current rate counter will initially contain the value 4, and the timer A hardware interrupt will occur at time intervals determined by the value 255. When four complete passes (four odd cycle and four even cycle) through the timer A interrupt routine have executed, the next listed set of values is loaded, namely (192, 1). Thus the timer A interrupt routine will execute one pass through the complete interrupt routine (odd cycle and even cycle) at a hardware interrupt rate determined by the value 192. The values 255 and 192 are indicative of timer period, thus the value 192 corresponds to a faster rate than the value 255. With continued reference to the one step move in the Appendix, having reached the approximate midpoint (five stepper motor steps), the stepper motor step rate begins to decelerate in symmetry with the way in which it accelerated.

Referring to the six step move set of values in the acceleration/deceleration tables in the Appendix, it will be seen that the six step move executes through four passes at the cold start rate (255, 4) and then commences acceleration in quantized steps until full acceleration is reached. The routine then executes 24 complete passes through the timer A interrupt routine at the full acceleration rate (64, 24). As will be seen by reviewing the acceleration/deceleration tables, the number of steps executed at the full acceleration rate depends upon the number of characters the print wheel must move. By increasing and decreasing the step rate is quantized steps, the optimum print wheel speed is achieved without loss of print wheel stepper motor synchronization.

While the invention has been described in its preferred embodiment, it is to be understood that the invention is capable of modification without departing from the true scope and spirit of the invention in its broader aspect.

APPENDIX

```
            309  ;----------------------------------------------------------------
            310  ;
            311  ;                        ACCEL TABLES
            312  ;
            313  ;     *THESE TABLES ARE THE TIMING DRIVER TABLES TO ADVANCE THE PRINT WHEEL TO
            314  ; THE NEXT CHARACTER .  IT STARTS WITH 0 [NO MOVEMENT ] AND WORKS UP TO 180
            315  ; DEGREES .
            316  ;
            317  ;----------------------------------------------------------------
            318
            319        GLB     ACCEL_TBL
            320
            321
            322
            323
            324
01AD        325 ACCEL_TBL
            326
01AD 01C3   327        DEFW    MOVE_0     ;ADDRESS OF TABLE TO MOVE 0 STEPS
01AF 01C6   328        DEFW    MOVE_1     ;ADDRESS OF TABLE TO MOVE 1 STEPS
01B1 01D1   329        DEFW    MOVE_2     ;ADDRESS OF TABLE TO MOVE 2 STEPS
01B3 01F0   330        DEFW    MOVE_3     ;ADDRESS OF TABLE TO MOVE 3 STEPS
01B5 020F   331        DEFW    MOVE_4     ;ADDRESS OF TABLE TO MOVE 4 STEPS
01B7 0250   332        DEFW    MOVE_5     ;ADDRESS OF TABLE TO MOVE 5 STEPS
01B9 0291   333        DEFW    MOVE_6     ;ADDRESS OF TABLE TO MOVE 6 STEPS
01BB 02D2   334        DEFW    MOVE_7     ;ADDRESS OF TABLE TO MOVE 7 STEPS
01BD 0313   335        DEFW    MOVE_8     ;ADDRESS OF TABLE TO MOVE 8 STEPS
01BF 0354   336        DEFW    MOVE_9     ;ADDRESS OF TABLE TO MOVE 9 STEPS
01C1 0395   337        DEFW    MOVE_10    ;ADDERSS OF TABLE TO MOVE 10 STEPS
```

```
                    338
                    339
                    340
01C3                341 MOVE_0
01C3 0A             342         DEFB    10
01C4 0000           343         DEFW    0
                    344
                    345
```

.E: TABLES:MICR       HEWLETT-PACKARD: Z80 Assembler

:ATION OBJECT CODE LINE      SOURCE LINE

```
01C6                346 MOVE_1
01C6 0A             347         DEFB    10
01C7 FF04           348         DEFB    255,4
01C9 C001           349         DEFB    192,1
01CB C001           350         DEFB    192,1
01CD FF04           351         DEFB    255,4
01CF 0000           352         DEFW    0
                    353
01D1                354 MOVE_2
01D1 14             355         DEFB    20
01D2 FF04           356         DEFB    255,4
01D4 C001           357         DEFB    192,1
01D6 9A01           358         DEFB    154,1
01D8 8001           359         DEFB    128,1
01DA 7601           360         DEFB    118,1
01DC 6E01           361         DEFB    110,1
01DE 6601           362         DEFB    102,1
01E0 6601           363         DEFB    102,1
01E2 6E01           364         DEFB    110,1
01E4 7601           365         DEFB    118,1
01E6 8001           366         DEFB    128,1
01E8 9A01           367         DEFB    154,1
01EA C001           368         DEFB    192,1
01EC FF04           369         DEFB    255,4
01EE 0000           370         DEFW    0
                    371
                    372
01F0                373 MOVE_3
01F0 1E             374         DEFB    30
01F1 FF04           375         DEFB    255,4
01F3 C001           376         DEFB    192,1
01F5 9A01           377         DEFB    154,1
01F7 8001           378         DEFB    128,1
01F9 7601           379         DEFB    118,1
01FB 6E01           380         DEFB    110,1
01FD 6606           381         DEFB    102,6
01FF 6606           382         DEFB    102,6
0201 6E01           383         DEFB    110,1
0203 7601           384         DEFB    118,1
0205 8001           385         DEFB    128,1
0207 9A01           386         DEFB    154,1
0209 C001           387         DEFB    192,1
020B FF04           388         DEFB    255,4
020D 0000           389         DEFW    0
                    390
                    391
020F                392 MOVE_4
020F 28             393         DEFB    40
0210 FF04           394         DEFB    255,4
0212 C001           395         DEFB    192,1
0214 9A01           396         DEFB    154,1
0216 8001           397         DEFB    128,1
0218 7601           398         DEFB    118,1
021A 6E01           399         DEFB    110,1
021C 6601           400         DEFB    102,1
021E 6001           401         DEFB    96,1
0220 5A01           402         DEFB    90,1
```

FILE: TABLES:MICR       HEWLETT-PACKARD: Z80 Assembler

LOCATION OBJECT CODE LINE      SOURCE LINE

```
0222 5501           403         DEFB    85,1
0224 5101           404         DEFB    81,1
0226 4D01           405         DEFB    77,1
0228 4901           406         DEFB    73,1
022A 4601           407         DEFB    70,1
022C 4301           408         DEFB    67,1                ;FULL ACCEL
                    409
022E 4004           410         DEFB    64,4
                    411
```

```
0230 4301      412        DEFB    67,1
0232 4601      413        DEFB    70,1
0234 4901      414        DEFB    73,1
0236 4D01      415        DEFB    77,1
0238 5101      416        DEFB    81,1
023A 5501      417        DEFB    85,1
023C 5A01      418        DEFB    90,1
023E 6001      419        DEFB    96,1
0240 6601      420        DEFB    102,1
0242 6E01      421        DEFB    110,1
0244 7601      422        DEFB    118,1
0246 8001      423        DEFB    128,1
0248 9A01      424        DEFB    154,1
024A C001      425        DEFB    192,1
024C FF04      426        DEFB    255,4
024E 0000      427        DEFW    0
               428
               429
0250           430 MOVE_5
0250 32        431        DEFB    50
0251 FF04      432        DEFB    255,4
0253 C001      433        DEFB    192,1
0255 9A01      434        DEFB    154,1
0257 8001      435        DEFB    128,1
0259 7601      436        DEFB    118,1
025B 6E01      437        DEFB    110,1
025D 6601      438        DEFB    102,1
025F 6001      439        DEFB    96,1
0261 5A01      440        DEFB    90,1
0263 5501      441        DEFB    85,1
0265 5101      442        DEFB    81,1
0267 4D01      443        DEFB    77,1
0269 4901      444        DEFB    73,1
026B 4601      445        DEFB    70,1
026D 4301      446        DEFB    67,1
               447                              ;FULL ACCEL
026F 400E      448        DEFB    64,14
               449
0271 4301      450        DEFB    67,1
0273 4601      451        DEFB    70,1
0275 4901      452        DEFB    73,1
0277 4D01      453        DEFB    77,1
0279 5101      454        DEFB    81,1
027B 5501      455        DEFB    85,1
027D 5A01      456        DEFB    90,1
027F 6001      457        DEFB    96,1
0281 6601      458        DEFB    102,1
0283 6E01      459        DEFB    110,1
FILE: TABLES:MICR        HEWLETT-PACKARD: Z80 Assembler

LOCATION OBJECT CODE LINE    SOURCE LINE 0285 7601      460        DEFB    118,1
0287 8001      461        DEFB    128,1
0289 9A01      462        DEFB    154,1
028B C001      463        DEFB    192,1
028D FF04      464        DEFB    255,4
028F 0000      465        DEFW    0
               466
               467
0291           468 MOVE_6
0291 3C        469        DEFB    60
0292 FF04      470        DEFB    255,4
0294 C001      471        DEFB    192,1
0296 9A01      472        DEFB    154,1
0298 8001      473        DEFB    128,1
029A 7601      474        DEFB    118,1
029C 6E01      475        DEFB    110,1
029E 6601      476        DEFB    102,1
02A0 6001      477        DEFB    96,1
02A2 5A01      478        DEFB    90,1
02A4 5501      479        DEFB    85,1
02A6 5101      480        DEFB    81,1
02A8 4D01      481        DEFB    77,1
02AA 4901      482        DEFB    73,1
02AC 4601      483        DEFB    70,1
02AE 4301      484        DEFB    67,1
               485                              ;FULL ACCEL
02B0 4018      486        DEFB    64,24
               487
02B2 4301      488        DEFB    67,1
02B4 4601      489        DEFB    70,1
02B6 4901      490        DEFB    73,1
02B8 4D01      491        DEFB    77,1
02BA 5101      492        DEFB    81,1
02BC 5501      493        DEFB    85,1
02BE 5A01      494        DEFB    90,1
02C0 6001      495        DEFB    96,1
02C2 6601      496        DEFB    102,1
02C4 6E01      497        DEFB    110,1
02C6 7601      498        DEFB    118,1
```

```
02C8 8001      499         DEFB    128,1
02CA 9A01      500         DEFB    154,1
02CC C001      501         DEFB    192,1
02CE FF04      502         DEFB    255,4
02D0 0000      503         DEFW    0
               504
               505
02D2           506 MOVE_7
02D2 46        507         DEFB    70
02D3 FF04      508         DEFB    255,4
02D5 C001      509         DEFB    192,1
02D7 9A01      510         DEFB    154,1
02D9 8001      511         DEFB    128,1
02DB 7601      512         DEFB    118,1
02DD 6E01      513         DEFB    110,1
02DF 6601      514         DEFB    102,1
02E1 6001      515         DEFB    96,1
02E3 5A01      516         DEFB    90,1
```

FILE: TABLES:MICR        HEWLETT-PACKARD: Z80 Assembler

LOCATION OBJECT CODE LINE    SOURCE LINE

```
02E5 5501      517         DEFB    85,1
02E7 5101      518         DEFB    81,1
02E9 4D01      519         DEFB    77,1
02EB 4901      520         DEFB    73,1
02ED 4601      521         DEFB    70,1
02EF 4301      522         DEFB    67,1
               523                                     ;FULL ACCEL
02F1 4022      524         DEFB    64,34
               525
02F3 4301      526         DEFB    67,1
02F5 4601      527         DEFB    70,1
02F7 4901      528         DEFB    73,1
02F9 4D01      529         DEFB    77,1
02FB 5101      530         DEFB    81,1
02FD 5501      531         DEFB    85,1
02FF 5A01      532         DEFB    90,1
0301 6001      533         DEFB    96,1
0303 6601      534         DEFB    102,1
0305 6E01      535         DEFB    110,1
0307 7601      536         DEFB    118,1
0309 8001      537         DEFB    128,1
030B 9A01      538         DEFB    154,1
030D C001      539         DEFB    192,1
030F FF04      540         DEFB    255,4
0311 0000      541         DEFW    0
               542
               543
0313           544 MOVE_8
0313 50        545         DEFB    80
0314 FF04      546         DEFB    255,4
0316 C001      547         DEFB    192,1
0318 9A01      548         DEFB    154,1
031A 8001      549         DEFB    128,1
031C 7601      550         DEFB    118,1
031E 6E01      551         DEFB    110,1
0320 6601      552         DEFB    102,1
0322 6001      553         DEFB    96,1
0324 5A01      554         DEFB    90,1
0326 5501      555         DEFB    85,1
0328 5101      556         DEFB    81,1
032A 4D01      557         DEFB    77,1
032C 4901      558         DEFB    73,1
032E 4601      559         DEFB    70,1
0330 4301      560         DEFB    67,1
               561                                     ;FULL ACCEL
0332 402C      562         DEFB    64,44
               563
0334 4301      564         DEFB    67,1
0336 4601      565         DEFB    70,1
0338 4901      566         DEFB    73,1
033A 4D01      567         DEFB    77,1
033C 5101      568         DEFB    81,1
033E 5501      569         DEFB    85,1
0340 5A01      570         DEFB    90,1
0342 6001      571         DEFB    96,1
0344 6601      572         DEFB    102,1
0346 6E01      573         DEFB    110,1
```

FILE: TABLES:MICR         HEWLETT-PACKARD: Z80 Assembler

LOCATION OBJECT CODE LINE     SOURCE LINE

```
0348 7601        574        DEFB    118,1
034A 8001        575        DEFB    128,1
034C 9A01        576        DEFB    154,1
034E C001        577        DEFB    192,1
0350 FF04        578        DEFB    255,4
0352 0000        579        DEFW    0
                 580
0354             581 MOVE_9
0354 5A          582        DEFB    90
0355 FF04        583        DEFB    255,4
0357 C001        584        DEFB    192,1
0359 9A01        585        DEFB    154,1
035B 8001        586        DEFB    128,1
035D 7601        587        DEFB    118,1
035F 6E01        588        DEFB    110,1
0361 6601        589        DEFB    102,1
0363 6001        590        DEFB    96,1
0365 5A01        591        DEFB    90,1
0367 5501        592        DEFB    85,1
0369 5101        593        DEFB    81,1
036B 4D01        594        DEFB    77,1
036D 4901        595        DEFB    73,1
036F 4601        596        DEFB    70,1
0371 4301        597        DEFB    67,1
                 598                              ;FULL ACCEL
0373 4036        599        DEFB    64,54
                 600
0375 4301        601        DEFB    67,1
0377 4601        602        DEFB    70,1
0379 4901        603        DEFB    73,1
037B 4D01        604        DEFB    77,1
037D 5101        605        DEFB    81,1
037F 5501        606        DEFB    85,1
0381 5A01        607        DEFB    90,1
0383 6001        608        DEFB    96,1
0385 6601        609        DEFB    102,1
0387 6E01        610        DEFB    110,1
0389 7601        611        DEFB    118,1
038B 8001        612        DEFB    128,1
038D 9A01        613        DEFB    154,1
038F C001        614        DEFB    192,1
0391 FF04        615        DEFB    255,4
0393 0000        616        DEFW    0
                 617
                 618
0395             619 MOVE_10
0395 64          620        DEFB    100
0396 FF04        621        DEFB    255,4
0398 C001        622        DEFB    192,1
039A 9A01        623        DEFB    154,1
039C 8001        624        DEFB    128,1
039E 7601        625        DEFB    118,1
03A0 6E01        626        DEFB    110,1
03A2 6601        627        DEFB    102,1
03A4 6001        628        DEFB    96,1
03A6 5A01        629        DEFB    90,1
03A8 5501        630        DEFB    85,1
```

FILE: TABLES:MICR         HEWLETT-PACKARD: Z80 Assembler

LOCATION OBJECT CODE LINE     SOURCE LINE

```
03AA 5101        631        DEFB    81,1
03AC 4D01        632        DEFB    77,1
03AE 4901        633        DEFB    73,1
03B0 4601        634        DEFB    70,1
03B2 4301        635        DEFB    67,1
                 636                              ;FULL ACCEL
03B4 4040        637        DEFB    64,64
                 638
03B6 4301        639        DEFB    67,1
03B8 4601        640        DEFB    70,1
03BA 4901        641        DEFB    73,1
03BC 4D01        642        DEFB    77,1
03BE 5101        643        DEFB    81,1
03C0 5501        644        DEFB    85,1
03C2 5A01        645        DEFB    90,1
03C4 6001        646        DEFB    96,1
03C6 6601        647        DEFB    102,1
```

```
03CB 6E01      648        DEFB    110,1
03CA 7601      649        DEFB    118,1
03CC 8001      650        DEFB    128,1
03CE 9A01      651        DEFB    154,1
03D0 C001      652        DEFB    192,1
03D2 FF04      653        DEFB    255,4
03D4 0000      654        DEFW    0
               655
```

What is claimed is:

1. A document printer comprising:
a print wheel rotatable about an axis and having a plurality of raised characters disposed at predetermined angular positions about the periphery of said wheel;
electrically actuable print hammer disposed radially of said print wheel and operable between retracted and print wheel impacting positions;
document transport means for supporting said document and for selectively positioning said document between said print wheel and said print hammer;
print wheel stepper motor for rotating said print wheel in incremental angular steps about said axis and having means for positioning a selected one of said raised characters in registrations with said print hammer;
driver means for controlling said print wheel stepper motor including means for determining the number of angular steps required to position said selected one of said characters in registration with said print hammer;
said drive means further including means for generating a plurality of current pulses for driving said print wheel stepper motor said pulses being produced in at least three discrete groups, the period between pulses and the number of pulses in each group being determined in accordance with said number of said incremental angular steps needed to rotate said print wheel to the next character to be printed.

2. The document printer of claim 1 wherein said drive means includes interrupt controller means for generating a first group of pulses occurring at a first rate and for generating a second group of pulses occurring at a second rate.

3. The document printer of claim 1 wherein said drive means includes means for increasing the step rate of said print wheel stepper motor in quantized increments.

4. The document printer of claim 1 wherein said drive means includes means for decreasing the step rate of said print wheel stepper motor in quantized increments.

5. The document printer of claim 1 wherein said drive means includes timer means for counting at a selectable rate.

6. The document printer of claim 5 wherein said selectable rate is determined in accordance with said number of incremental angular steps.

7. The document printer of claim 5 wherein said selectable rate is periodically altered.

8. The document printer of claim 5 wherein said selectable rate is alterable at a rate determined in accordance with the counting rate of said timer.

9. The document printer of claim 5 further comprising look up table means for determining said selectable rate.

10. A document printer comprising:
a print wheel rotatable about an axis and having a plurality of raised character disposed at predetermined angular positions about the periphery of said wheel;
electrically actuable print hammer disposed radially of said print wheel and operable between retracted and print wheel impacting positions;
document transport means for supporting said document and for selectively positioning said document between said print wheel and said print hammer;
print wheel stepper motor for rotating said print wheel in incremental angular steps about said axis and having means for positioning a selected one of said raised characters in registrations with said print hammer;
driver means for controlling said print wheel stepper motor including means for determining the number of angular steps required to position said selected one of said characters in registration with said print hammer;
said drive means further including means for generating a plurality of current pulses for driving said print wheel stepper motor, the period between said pulses being selectively variable in accordance with said number of said incremental angular steps needed to rotate said print wheel to the next character to be printed;
interrupt controller providinga high priority timer A interrupt signal and a low priority timer B interrupt signal;
means for performing a timer A interrupt routine in response to said timer A interrupt signal, said timer A interrupt routine being responsive to said number of angular steps requried and determining a table of ordered pairs of values, one value of each pair representing an interrupt rate value and the other value representing a number of interrupt cycles;
said timer A interrupt routine having an odd cycle for selectively altering the rate of said timer A interrupt signal in accordance with said interrupt rate value;
said timer A interrupt routine having an even cycle for selectively causing said driver means to activate said stepper motor;
means for performing a timer B interrupt routine in responsse to said timer B interrupt signal, said timer B interrupt routine determining if said document is positioned and providing an indication thereof to said timer A interrupt routine;
means responsive to said timer A interrupt routine and said timer B interrupt routine for selectively operating said hammer.

* * * * *

UNITED STATES PATENT AND TRADEMARK OFFICE
CERTIFICATE OF CORRECTION

PATENT NO.  :  4,541,334  
DATED       :  September 17, 1985  
INVENTOR(S) :  LIEDTKE, ET AL It is certified that error appears in the above-identified patent and that said Letters Patent is hereby corrected as shown below:

On the Title Page, Under Assignee, "MICR Short Systems, Ltd.," should be —MICR Systems Short Ltd.—.

Column 1, line 19, "charactes" should be —characters—.

Column 1, line 26, "manually-handled" should be —manually handled—.

Column 6, line 4, "drives" should be —drivers—.

Column 7, line 58, "hardware" should be —hardwire—.

Column 9, line 46, "timer" should be —time—.

Column 10, line 32, "is" should be —in—. (2nd occurrence).

Column 11, line 20, "state" should be —start—.

Column 11, line 28, "beenn" should be —been—.

Column 12, line 35, "is" should be —in—.

Column 21, line 54, Claim 6, after "wherein", insert —said timer means includes means for generating a selectable rate and wherein—.

Column 21, line 56, Claim 7, after "wherein", insert —said timer means includes means for generating a selectable rate and wherein—.

UNITED STATES PATENT AND TRADEMARK OFFICE
CERTIFICATE OF CORRECTION

PATENT NO. : 4,541,334

DATED : September 17, 1985

INVENTOR(S) : LIEDTKE, ET AL

It is certified that error appears in the above-identified patent and that said Letters Patent is hereby corrected as shown below:

Column 22, line 3, Claim 10, "character" should be —characters—.

Column 22, line 37, Claim 10, "providinga" should be —providing a—.

Column 22, line 57, Claim 10, "responsse" should be —response—.

Signed and Sealed this

Eighteenth Day of November, 1986

Attest:

DONALD J. QUIGG

Attesting Officer      Commissioner of Patents and Trademarks